United States Patent [19]

Lecomte

[11] Patent Number: 4,534,305
[45] Date of Patent: Aug. 13, 1985

[54] SAIL SKI DEVICE

[76] Inventor: Francois Lecomte, "La Grande Chalande", 88530 Le Tholy, France

[21] Appl. No.: 468,634

[22] Filed: Feb. 22, 1983

[30] Foreign Application Priority Data

Aug. 11, 1982 [FR] France .................................. 82 14142

[51] Int. Cl.³ .............................................. A63C 15/00
[52] U.S. Cl. ........................................ 441/73; 114/39; 441/73
[58] Field of Search ...................... 441/65, 67, 68, 72, 441/73, 74; 114/39; 280/601, 810, 816, 818, 11.33

[56] References Cited

U.S. PATENT DOCUMENTS

| 2,732,217 | 1/1956 | Dore | 280/11.33 |
| 3,127,622 | 4/1964 | Drennen | 441/72 |
| 3,216,031 | 11/1965 | Ingold, Jr. | 441/68 |

FOREIGN PATENT DOCUMENTS 2493789  5/1982  France .................................. 280/810

Primary Examiner—Jesus D. Sotelo
Attorney, Agent, or Firm—Young & Thompson

[57] ABSTRACT

A sail ski device in which the skis (4) have a longitudinal section incurved from the center to the ends, the ends having each a nose (5). The central portion of each ski (4) is provided with a rigid securement element (6) on which are mounted elastic blocks (7) secured to the platform (1).

2 Claims, 4 Drawing Figures

SAIL SKI DEVICE

The present invention relates to the field of recreation, particularly recreational sport, and more particularly sporting articles for this purpose, and has for its object a sail ski device.

At the present, various devices exist that permit matching the skill of sailboarding with that of skiing. These devices are generally constituted by a platform having on opposite sides ski bindings and receiving a sailboard mast, or else are in the form of a cradle interconnecting the skis, and on which is secured an entire sailboard.

However, in the case of a platform secured to the skis by means of an element clamped in the bindings, the mounting of the platform is rigid, permitting no relative displacement between the platform and the skis, and the skis used are deep snow or cross country skis permitting practically no change in direction or course by action on the platform and/or on the mast.

Moreover, in the case of using a receiving cradle for a complete ski board secured to the skis, the size of the device makes its transportation difficult and considerably impedes its handling.

The present invention has for its aim to overcome these difficulties.

Thus, it has for its object a sail ski device, constituted essentially by a platform for securement of the mast and for support of the user provided with an anti-skid coating, and secured to a pair of skis, characterized in that the skis have a longitudinal section incurved from the center toward the ends, which are provided each with a nose and in that the central portion of each ski is provided with a rigid vertical securement element on which are mounted elastic blocks secured to the platform.

The invention will be better understood from the following description, which relates to a preferred embodiment, given by way of non-limitative example, and explained with reference to the accompanying schematic drawings, in which.

Figure 1:
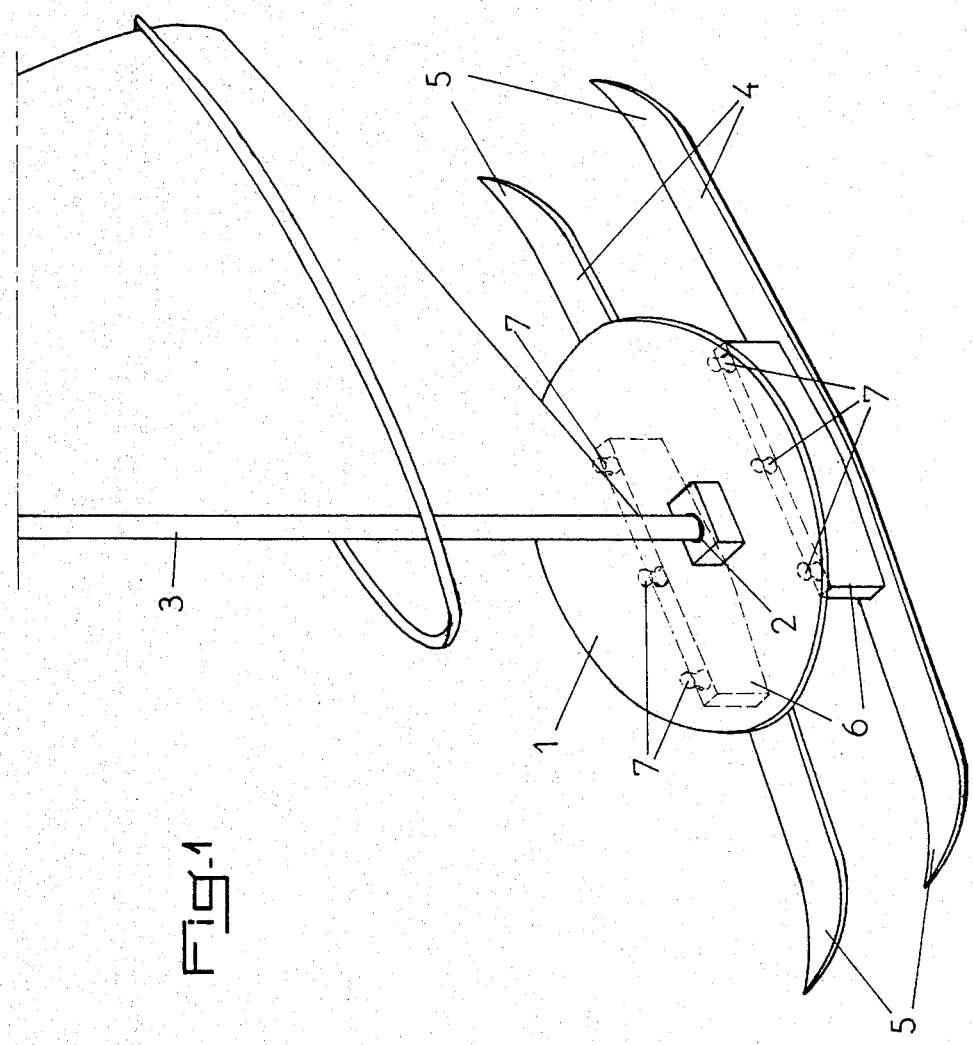
FIG. 1 is a perspective view of a device according to the invention.
Figure 2:
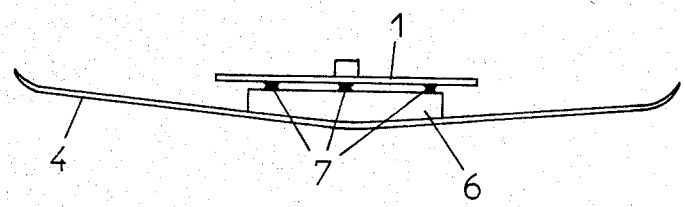
FIG. 2 is a view in side elevation, on a smaller scale, of the device without the mast.
Figure 3:
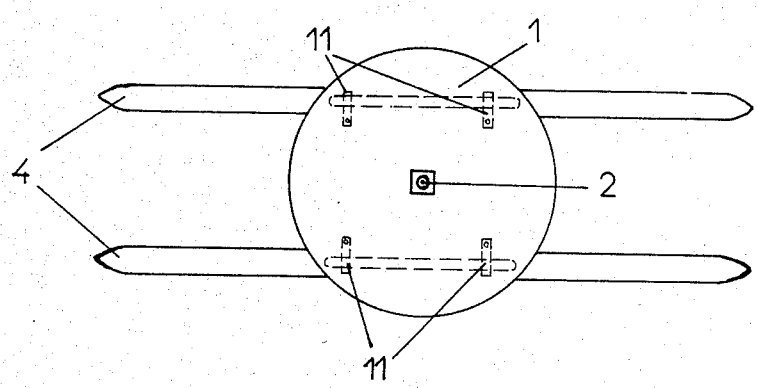
FIG. 3 is a plan view of FIG. 2.

According to the invention, and as shown more particularly in FIGS. 1-3 of the accompanying drawings, the sail ski device, which is constituted by a platform 1, serving to support the user, and provided with a foot 2 for mounting of the mast 3 and an anti-skid coating, and by a pair of skis 4 secured to the platform 1, is characterized in that the skis 4 have a longitudinal section which is incurved from the center toward each end, and each of the latter is provided with a nose 5. The central portion of each ski 4 is provided with a rigid vertical securement member 6 on which are mounted elastic blocks 7 secured to the platform 1.

By way of example, the skis typically have a length of 2200 mm, a width of 87 mm, and a thickness of 20 mm, and the difference in height between the middle and the ends is preferably equal to 100 mm, whereby a rocking effect can be easily achieved.

These skis may be made in known manner from cemented laminated wood encased in a synthetic coating, or of synthetic material reinforced with glass fibers, or of metal.

Thanks to their incurved shape and their forward and rear noses, a change of direction of the device is easy to achieve by action on the platform 1 and on the mast 3, in the manner of controlling a sailboard.

Moreover, maneuverability is further facilitated by the presence of the elastic blocks 7, which permit a limited pivoting of the skis parallel to the longitudinal axis of the platform 1, whereby the device according to the invention has a very great flexibility in the snow.

Figure 4:
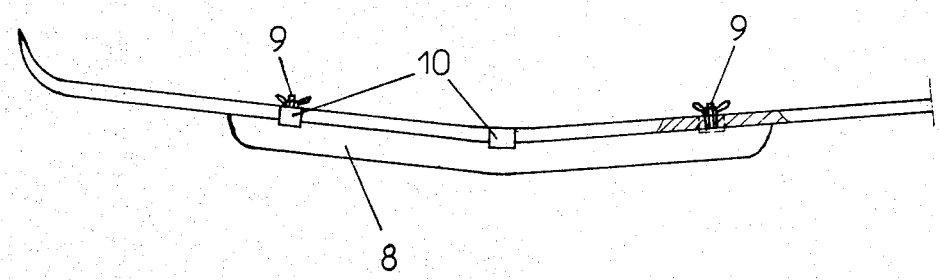
FIG. 4 is a side elevational view, on a larger scale, partially in cross section, of a ski provided with an ice skate runner.

According to a modified embodiment of the invention, for use on ice, the skis 4 are advantageously provided with metal runners 8 beneath their central portion, and secured by means of clamps 9 or the like, their lateral support being ensured, moreover, by means of stirrups 10 secured to runners 8 and bearing on the sides of skis 4 (FIG. 4).

In such an embodiment, the platform 1 is provided at its lower portion with members for blocking the rigid elements 6 for securing the skis 4, thus cancelling the action of the elastic blocks 7, in the form of pivotal shoes 11 (FIG. 3) adapted to be positioned between the elements 6 and the platform 1, or in the form of stirrups foldable about said elements 6, or of similar devices.

The pivoting of the shoes 11 between the elements 6 and the platform 1 thus prevents any deformation of the elastic blocks 7, whereby the connection between the elements 6 and the platform 1 becomes a rigid connection. The same result is obtained by means of stirrups pivotally mounted against the platform 1 and gripping, in the operative position, the elements 6, whereby these latter can no longer pivot relative to said platform 1.

This blockage of the action of the elastic blocks 7 is necessary for using the device on ice, because the contact surfaces are greatly diminished and pivoting of a runner blade 8 relative to the platform 1 would greatly endanger the stability of the device.

According to another modified form of the invention, not shown in the accompanying drawings, the platform 1 may be connected to a single ski, the rigid securement element 6 being then connected by means of blocks 7 to the platform 1 along its longitudinal axis.

By virtue of the invention, it is possible to sail over the snow using the action of the wind, and employing a technique comparable to that necessary for the use of a sailboard. Moreover, because of the particular shape of the skis 4, a change of direction or course is possible, without further maneuvering such as braking.

Of course, the invention is not limited to the embodiments described and shown in the accompanying drawings. Modifications are possible, particularly with respect to the construction of the various elements, or by substitution of technical equivalents, without thus departing from the scope of protection of the invention.

What is claimed is:

1. Sail ski device, essentially constituted by a platform (1) for mounting a mast (3) and for supporting the user and having an anti-skid coating, and secured to a pair of skis (4), characterized in that the skis (4) have a longitudinal section incurved from the center toward the ends, which are each provided with a nose (5), and in that the central portion of each ski (4) is provided with a vertical rigid mounting member (6) on which are mounted elastic blocks (7) secured to the platform (1), in which for use on ice, the skis (4) are provided with metallic runners (8) extending beneath their central portion, and secured by means of clamps (9) or the like, their lateral bearing being ensured by means of stirrups (10) secured to the runners (8) and bearing on the sides of the skis (4).

2. Device according to claim 1, characterized in that the platform (1) is provided at its lower portion with insertable and removable blocking members for the rigid mounting elements (6) of the skis (4) cancelling the action of the elastic blocks (7).

* * * * *